US012581192B2

(12) United States Patent　(10) Patent No.:　US 12,581,192 B2

Zhu　(45) Date of Patent:　Mar. 17, 2026

(54) ELECTRONIC DEVICE AND CONTROL METHOD

(71) Applicant: VIVO MOBILE COMMUNICATION CO., LTD., Guangdong (CN)

(72) Inventor: Lei Zhu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 205 days.

(21) Appl. No.: 18/334,631

(22) Filed: Jun. 14, 2023

(65) Prior Publication Data

US 2023/0328377 A1　Oct. 12, 2023

Related U.S. Application Data

(63) Continuation of application No. PCT/CN2021/137691, filed on Dec. 14, 2021.

(30) Foreign Application Priority Data

Dec. 17, 2020　(CN) ......................... 202011492693.2

(51) Int. Cl.
　*H04N 23/68*　(2023.01)
　*H04N 23/54*　(2023.01)
　*H04N 23/57*　(2023.01)

(52) U.S. Cl.
　CPC ........... *H04N 23/687* (2023.01); *H04N 23/54* (2023.01); *H04N 23/57* (2023.01)

(58) Field of Classification Search
　CPC ...... H04N 23/687; H04N 23/54; H04N 23/57;

H04N 23/51; H04N 23/685; H04N 23/55; H04N 23/50; H04N 23/65; H04N 23/6812; G03B 2205/0007; G03B 2205/0069; G03B 17/561; G03B 30/00

See application file for complete search history.

(56) References Cited

U.S. PATENT DOCUMENTS

| | | | | |
|---|---|---|---|---|
| 2013/0107068 A1* | 5/2013 | Kim | ..................... | H04N 23/687 |
| | | | | 348/208.7 |
| 2015/0201114 A1* | 7/2015 | Shin | ....................... | H04N 23/51 |
| | | | | 348/375 |
| 2017/0374247 A1* | 12/2017 | Minamisawa | ......... | H04N 23/55 |
| 2018/0146130 A1* | 5/2018 | Lee | ........................... | G03B 5/00 |
| 2018/0149828 A1* | 5/2018 | Choi | ..................... | G02B 7/105 |
| 2019/0020822 A1* | 1/2019 | Sharma | ................ | G02B 27/646 |
| 2020/0412853 A1 | 12/2020 | Zhu et al. | | |

(Continued)

FOREIGN PATENT DOCUMENTS

| | | |
|---|---|---|
| CN | 106534654 A | 3/2017 |
| CN | 108174079 A | 6/2018 |

(Continued)

*Primary Examiner* — Timothy J Henn

(74) *Attorney, Agent, or Firm* — Price Heneveld LLP

(57) ABSTRACT

This application discloses an electronic device and a control method. The electronic device includes a controller, a power manager, a detector, and a camera apparatus, wherein the camera apparatus includes a camera module and a cavity; a permanent magnet is disposed on the camera module; a coil is disposed on an inner wall of the cavity; the camera module is disposed in the cavity; the controller is separately connected to the detector, the power manager, and the camera apparatus; and the power manager is connected to the camera apparatus.

15 Claims, 4 Drawing Sheets

10

12

11

(56)     References Cited

U.S. PATENT DOCUMENTS

| | | |
|---|---|---|
| 2021/0021771 A1 | 1/2021 | Kimura et al. |
| 2021/0409602 A1* | 12/2021 | Le ............................ G03B 5/06 |
| 2022/0407997 A1 | 12/2022 | Zhang et al. |
| 2023/0036225 A1 | 2/2023 | Pang |

FOREIGN PATENT DOCUMENTS

| | | | |
|---|---|---|---|
| CN | 108737737 A | 11/2018 |
| CN | 109361968 A | 2/2019 |
| CN | 208836276 U | 5/2019 |
| CN | 209402560 U | 9/2019 |
| CN | 110488451 A | 11/2019 |
| CN | 110673656 A | 1/2020 |
| CN | 111212209 A | 5/2020 |
| CN | 111510598 A | 8/2020 |
| CN | 111654611 A | 9/2020 |
| CN | 111654612 A | 9/2020 |
| CN | 111787207 A | 10/2020 |
| CN | 112492217 A | 3/2021 |
| JP | 2006349942 A | 12/2006 |
| JP | 2011081288 A | 4/2011 |
| JP | 2015114615 A | 6/2015 |
| JP | 2017173757 A | 9/2017 |
| RU | 2725155 C1 | 6/2020 |
| WO | 2019188387 A1 | 10/2019 |

* cited by examiner

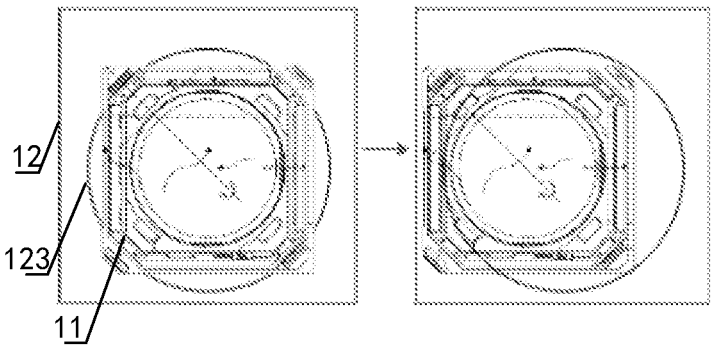

FIG. 5a

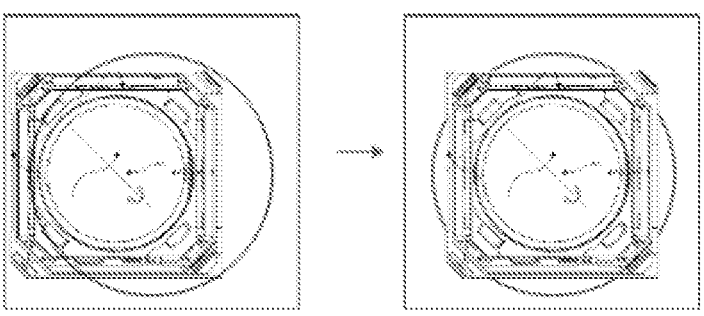

FIG. 5b

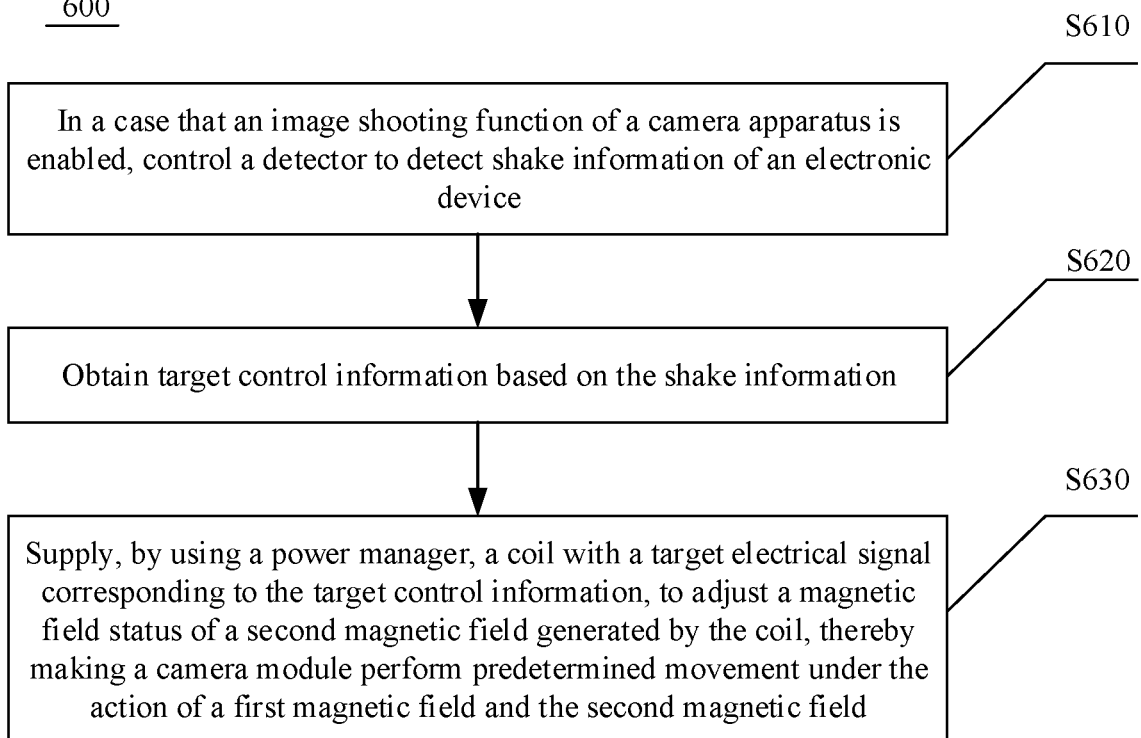

600

In a case that an image shooting function of a camera apparatus is enabled, control a detector to detect shake information of an electronic device

S610

Obtain target control information based on the shake information

S620

Supply, by using a power manager, a coil with a target electrical signal corresponding to the target control information, to adjust a magnetic field status of a second magnetic field generated by the coil, thereby making a camera module perform predetermined movement under the action of a first magnetic field and the second magnetic field

ELECTRONIC DEVICE AND CONTROL METHOD

TECHNICAL FIELD

This application belongs to the field of electronic information technologies, and specifically relates to an electronic device and a control method.

BACKGROUND

With the development and popularization of smartphones, people have increasingly higher requirements for image shooting functions of smartphones, and even expect that an image shooting effect of a smartphone can reach an image shooting level of a single-lens reflex camera.

During use of a smartphone, if a user holds the smartphone by hand to take a picture, shake of the hand leads to a slight inclination (generally, within +/−0.5 degrees) of a camera module in the smartphone, and the inclination changes a viewing angle of a camera lens. As a result, a captured image is in an unstable state due to the shake of the hand. To resolve the shake-induced problem, electronic image stabilization (EIS) and optical image stabilization (OIS) are mainly used in related technologies to achieve image stabilization of a camera.

Electronic image stabilization mainly includes two types: "natural image stabilization" implemented by increasing the camera's photosensibility (ISO) and "digital image stabilization" implemented by using pixel compensation or another operation manner. In addition, image stabilization implemented via electronic image stabilization does not require any components for assistance and participation, but completely depends on a digital processing technology.

Optical image stabilization avoids or reduces shake of a camera lens in an optical signal capturing process mainly by disposing an optical component, for example, moving a lens or a photosensitive plate for optical path compensation, thereby improving imaging quality.

However, the above two image stabilization methods can be used only for image stabilization in two-dimensional space (directions of X-axis and Y-axis), but cannot resolve the problem of camera lens shake in three-dimensional space, such as image shooting implemented through vertical camera lens reverse movement.

SUMMARY

Embodiments of this application provide an electronic device and a control method, which can resolve the problem of image shake in three-dimensional space such as image shooting implemented through vertical camera lens reverse movement.

This application is implemented as follows:

According to a first aspect, an embodiment of this application provides an electronic device, including a controller, a power manager, a detector, and a camera apparatus, where the camera apparatus includes a camera module and a cavity; a permanent magnet is disposed on the camera module; a coil is disposed on an inner wall of the cavity; the camera module is disposed in the cavity; the controller is separately connected to the detector, the power manager, and the camera apparatus; and the power manager is connected to the camera apparatus.

According to a second aspect, an embodiment of this application provides a control method, applied to the electronic device according to the first aspect. The method includes: in a case that an image shooting function of a camera apparatus is enabled, controlling a detector to detect shake information of the electronic device; obtaining target control information based on the shake information, where the target control information includes a size and/or a direction of an electrical signal; and supplying, by using a power manager, a coil with a target electrical signal corresponding to the target control information, to adjust a magnetic field status of a second magnetic field generated by the coil, thereby making a camera module perform predetermined movement under the action of a first magnetic field and the second magnetic field, where the predetermined movement includes displacement and/or angular deflection, and the first magnetic field is generated by a permanent magnet in the camera apparatus.

Embodiments of this application provide an electronic device and a control method. The electronic device includes a controller, a power manager, a detector, and a camera apparatus, where the camera apparatus includes a camera module and a cavity; a permanent magnet is disposed on the camera module; a coil is disposed on an inner wall of the cavity; the camera module is disposed in the cavity; the controller is separately connected to the detector, the power manager, and the camera apparatus; and the power manager is connected to the camera apparatus. Therefore, when the electronic device is used for mobile image shooting, an image shooting direction of the camera apparatus in the electronic device remains unchanged, thereby realizing instantaneous image stabilization of the electronic device in three-dimensional space.

BRIEF DESCRIPTION OF DRAWINGS

FIG. 5a and FIG. 5b are schematic diagrams of image stabilization principles of an electronic device according to an example embodiment of this application; and FIG. 6 is a schematic flowchart of a control method according to an example embodiment of this application.

DESCRIPTION OF EMBODIMENTS

The following clearly and completely describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that, data termed in such a way is interchangeable in proper circumstances, so that the embodiments of this application can be implemented in an order other than the order illustrated or described herein. In addition, in the specification and claims, "and/or" represents at least one of connected objects, and a character "/" generally represents an "or" relationship between associated objects.

With reference to the accompanying drawings, the technical solutions provided in the embodiments of this application are described in detail by using specific embodiments and application scenarios.

An example embodiment of this application provides an electronic device. For example, the electronic device may be, but is not limited to, a mobile phone, a tablet computer, a notebook computer, a palmtop computer, an in-vehicle electronic device, a wearable device, an ultra-mobile personal computer (ultra-mobile personal computer, UMPC), a netbook, or a personal digital assistant (personal digital assistant, PDA). This is not specifically limited in this embodiment of this application. It should be noted that, the technical solutions provided in this application are described in the following embodiments by using only an example in which the electronic device is a mobile phone.

Figure 1:
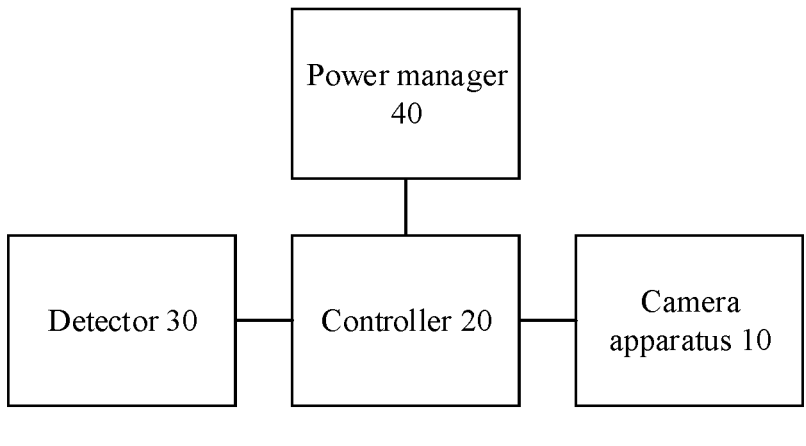
FIG. 1 is a schematic diagram of a circuit structure of an electronic device according to an example embodiment of this application.

As shown in FIG. 1, the electronic device includes a camera apparatus 10, a controller 20, a detector 30, and a power manager 40. The controller 20 is separately connected to the detector 30, the power manager 40, and the camera apparatus 10. The power manager 40 is connected to the camera apparatus 10.

Figure 2A:
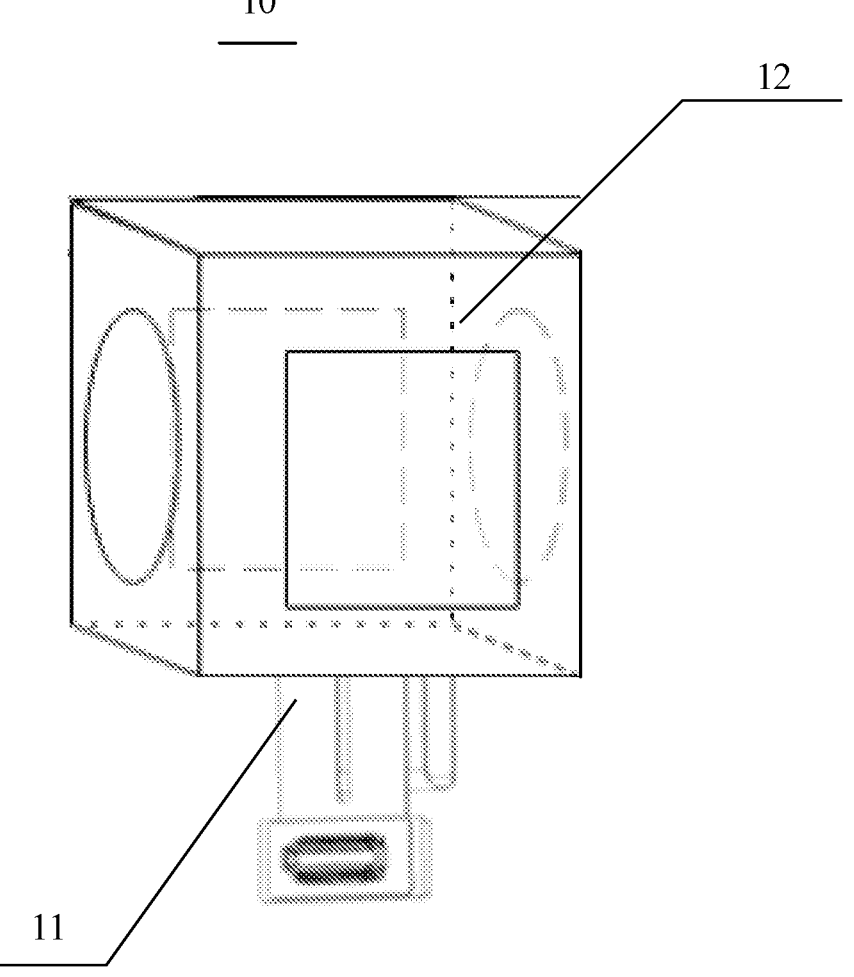
FIG. 2a is a schematic diagram of a structure of a camera apparatus according to an example embodiment of this application.
Figure 2B:
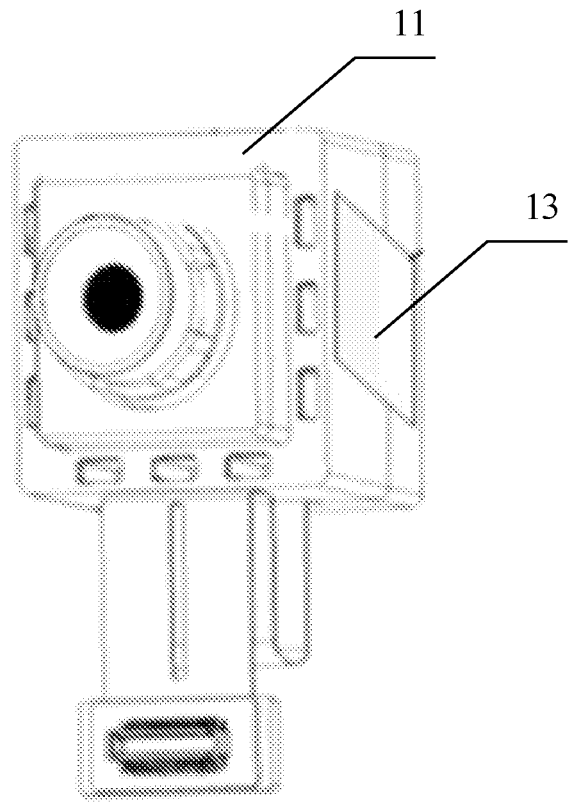
FIG. 2b is a schematic diagram of a structure of a camera module according to an example embodiment of this application.
Figure 2C:
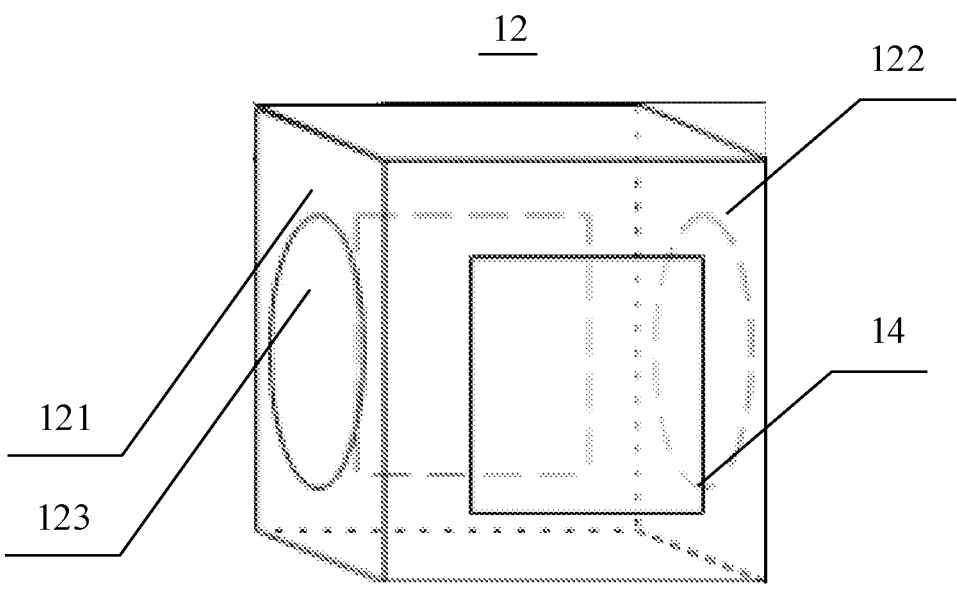
FIG. 2c is a schematic diagram of a structure of a cavity according to an example embodiment of this application.

With reference to FIG. 2a, FIG. 2b, and FIG. 2c, the camera apparatus 10 may include a camera module 11 and a cavity 12. A permanent magnet 13 is disposed on the camera module 11. A coil 14 is disposed on an inner wall of the cavity 12. The camera module 11 is disposed in the cavity 12.

The permanent magnet 13 is configured to generate a first magnetic field, and the coil 14 is configured to generate a second magnetic field when energized, so that the camera module 11 can perform predetermined movement, for example, displacement and/or angular deflection, under the joint action of the first magnetic field generated by the permanent magnet 13 and the second magnetic field generated by the coil 14. Therefore, when the electronic device is used in mobile image shooting, an absolute spatial position of the camera module 11 in the electronic device remains unchanged, that is, an image shooting direction of the camera apparatus 10 remains unchanged. In this way, instantaneous image stabilization in three-dimensional space of the electronic device (namely, the camera apparatus 10) is realized, thereby ensuring quality of a captured picture or video, and improving user experience.

In one or more embodiments of this application, the permanent magnet 13 may be separately disposed on a surface of the camera module 11, or the permanent magnet 13 is a component, in the camera module 11, made of a permanent magnet material, such as a housing of the camera module 11.

In an implementation, there are a plurality of permanent magnets 13. The camera module 11 includes at least two surfaces. Each of the permanent magnets 13 is disposed on one of the at least two surfaces (namely, different housings). For example, the permanent magnets 13 are in a one-to-one correspondence with the surfaces; or one of the surfaces is provided with a plurality of permanent magnets; or the permanent magnets 13 are disposed on some of the surfaces of the camera module 11. This is not limited in this embodiment.

For example, in a case that the camera module 11 includes a first surface and a second surface, a direction of a first magnetic field generated by the permanent magnet on the first surface is opposite to that of a first magnetic field generated by the permanent magnet on the second surface, and the first surface and the second surface are disposed back to back. In other words, the plurality of permanent magnets 13 may be respectively arranged on different surfaces of the camera module 11, and the directions of the first magnetic fields generated by the permanent magnets 13 on the two opposite surfaces are opposite. Therefore, it is ensured that magnetic flux in the camera module is 0, to avoid an impact of a magnetic field on quality of an image obtained during image shooting.

In this embodiment, the permanent magnets 13 may, but are not limited to, be made of natural magnets or synthetic magnets.

In one or more embodiments of this application, with reference to FIG. 2c, there may be a plurality of coils 14. The cavity 12 includes at least two inner walls that are in a one-to-one correspondence with the coils, and the coils are respectively disposed on at least two of the inner walls. For example, assuming that the cavity is the cubic cavity shown in FIG. 2c, the coil 14 may be a square on an inner wall of the cavity, for example, a dashed-line box or a solid-line box, as shown in FIG. 2c. Then, in a case that the coils 14 are electrified, the camera module 11 can be suspended in the cavity 12 under the joint action of the plurality of first magnetic fields generated by the plurality of permanent magnets 13 and the plurality of second magnetic fields generated by the plurality of coils 14. Therefore, the problem that the camera module 11 and the cavity 12 may collide in a mobile image shooting process performed by using the electronic device can be resolved, thereby avoiding damage to the camera module 11 and prolonging the service life of the electronic device.

In an implementation, each of the coils 14 may include at least two sub-coils, the at least two sub-coils are separately connected to the power manager, and the power manager 40 is configured to separately control magnetic forces generated by the at least two sub-coils. In this way, when image shooting is performed by using the electronic device, the camera module 11 is enabled, by controlling a magnetic force difference between the sub-coils, to flip and twist in the cavity 12, thereby ensuring control accuracy of the camera module 11.

Figure 3:
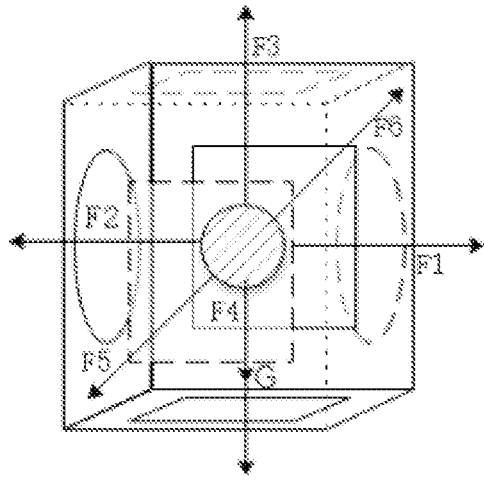
FIG. 3 is a schematic diagram of stress analysis of a camera module according to an example embodiment of this application.

For example, assuming that the camera module 11 is suspended in the cavity 12 under the joint action of the first magnetic field and the second magnetic field before the image shooting function of the electronic device is enabled, force analysis of the camera module 11 may be shown in FIG. 3, where F1 to F6 respectively denote magnetic forces on the six surfaces of the camera module 11, and G denotes gravity of the camera module 11. In this case, if the image shooting function is enabled, a direction and/or a size of the second magnetic field (magnetic force) generated by the coil 14 can be controlled by adjusting a direction and/or a size of the electrical signal (for example, a current signal) supplied to the coil 14. For example, a spatial position of the camera module 11 in the cavity 12 can be controlled by adjusting magnetic forces in the six directions shown in FIG. 3, so that an external force on the camera module 11 is 0, and magnetic levitation is realized.

Figure 4:
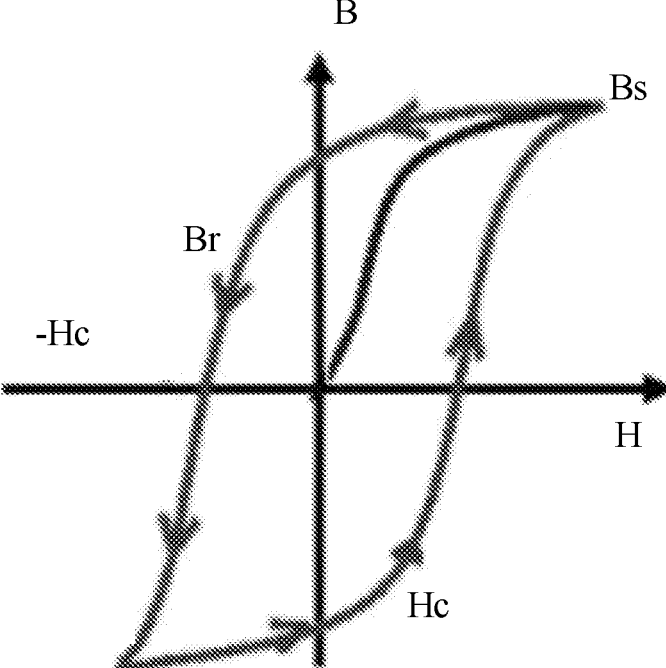
FIG. 4 is a schematic diagram of a magnetic force recovery process according to an example embodiment of this application.

It should be noted that after a magnet (namely, the coil) is magnetized to a saturated state, if a magnetic field intensity (H) of the magnet gradually decreases from a maximum value, a magnetic induction intensity (symbol: B) of the magnet does not return along an original path, but decreases along a curve that is slightly higher than the original path. This phenomenon is called hysteresis. For example, a change process of the magnetic induction intensity is shown in FIG. 4. Because a magnetic force is in direct proportion to a magnetic induction intensity, a relationship between changes of the magnetic force and the magnetic field intensity also follows the "hysteresis principle". In this embodiment, a severe shaking process that occurs during a mobile image shooting process is transformed into a slow and steady changing process by using this principle, so that physical image stabilization (instantaneous image stabilization) during the image shooting process is realized. For example, nearly +45° image stabilization can be realized by equipping the electronic device with the camera module 11 that has a convex lens. In other words, the camera apparatus 10 or the electronic device provided in this embodiment can implement image stabilization at a larger angle, so that an application environment is wider.

On the basis of the foregoing description, the cavity 12 may be but is not limited to one of a cubic cavity, a cuboid-shaped cavity, and a spherical cavity. For example, still referring to FIG. 2c, in a case that the cavity 12 is a cubic cavity, each inner wall of the cubic cavity may be provided with the coil 14. In addition, it should be noted that coils on different inner walls may be the same or different, and may be specifically set according to actual needs.

In an implementation, still referring to FIG. 2c, the cavity 12 may include a first side wall 121 and a second side wall 122 that are opposite to each other. The first side wall 121 is provided with a first camera lens hole. The second side wall 122 is provided with a second camera lens hole corresponding to the first camera lens hole. Lenses are respectively mounted in the first camera lens hole and the second camera lens hole. A camera lens of the camera module faces the first camera lens hole. In this way, it can be ensured that magnetic fields generated by the coil 14 on the first side wall 121 and the coil 14 on the second side wall 122 are balanced, thereby ensuring image stabilization reliability during image shooting.

The detector 30 is configured to detect shake information of the electronic device during the image shooting process. The shake information may include but is not limited to at least one of longitudinal/latitudinal displacement information, altitude information, and a rotation angle. In an implementation, when the electronic device controls the camera apparatus 10 to enable the image shooting function, the detector 30 starts to detect shake information of the electronic device in real time.

In this embodiment, the detector 30 may be but is not limited to a gyroscope, and may be disposed on a PCB of the electronic device.

The controller 20 is configured to control the detector 30, the power manager 40, and the camera apparatus 10. The controller 20 is configured to: analyze the shake information when receiving the shake information sent by the detector 30, to obtain target control information; and send the target control information to the power manager 40. The target control information includes a size and/or a direction of an electrical signal. The electrical signal may be a current signal or the like.

In an implementation, the controller 20 may be connected to the camera module 11 in the camera apparatus 10 by using a flexible printed circuit board (Flexible Printed Circuit Board, FPC).

The power manager 40 is configured to implement power management for each component in the electronic device, for example, powering on, powering off, and adjusting a size and a direction of an electrical signal, or the like. In this embodiment, in a case that the target control information sent by the controller 20 is received, the power manager 40 supplies the coil 14 with a target electrical signal corresponding to the target control information, to adjust a magnetic field status of the second magnetic field, thereby making the camera module 11 perform predetermined movement under the action of the first magnetic field and the second magnetic field, where the predetermined movement includes displacement and/or angular deflection. The target electrical signal may be a voltage signal or a current signal.

In an implementation, if there are a plurality of coils 14, and/or the coil 14 includes a plurality of sub-coils, in a case that the target control information is received, the power manager 40 first determines a target coil (a coil or a sub-coil) on which power management (for example, adjusting a size or/and a direction of an electrical signal) needs to be performed, and then supplies the target coil with an electrical signal that matches the target control information, thereby ensuring the reliability of a control result.

For example, based on the foregoing description of the electronic device, an image stabilization process of the electronic device is described below by using an example in which the electronic device is a mobile phone. Herein, referring to FIG. 2a to FIG. 2c, assuming that the cavity 12 in the camera apparatus 10 is a cubic cavity, and that each inner wall is provided with the coil 14, when the mobile phone is used for taking a picture normally, the camera module 11 remains in a magnetic levitation stable state.

(1) After controlling the camera apparatus 10 to enable the image shooting function, the controller controls the detector 30 to start detecting shake information of the mobile phone in real time, and feeds back the detected shake information (longitudinal and latitudinal displacement, an altitude, a rotation angle, and the like) to the controller 20.

(2) The controller 20 analyzes the received shake information to obtain target control information, and sends the target control information to the power manager 40, where the target control information is information including a size or a direction of a current of each coil 14 that required for spatial position correction of the camera module 11.

(3) The power manager 40 supplies the coil with a target electric signal corresponding to the target control information, so that a magnetic field of the coil 14 changes. In addition, a size and a direction of a magnetic force on the camera module 11 in the magnetic field change, so that the camera module 11 performs corresponding displacement and rotation under the action of magnetic forces in all directions, and an absolute spatial position of the camera module 11 is unchanged after the adjustment (as shown in FIG. 5a), that is, an image shooting direction of the camera module 11 is unchanged after the mobile phone shakes, thus achieving instantaneous image stabilization.

In addition, after a changed target electrical signal passes through the coil 14, a current in the coil 14 returns to an initial state (namely, before-shake state). In addition, referring to FIG. 5b, due to an impact of a hysteresis effect, when the current in the coil 14 returns to the initial state, a magnetic force on the camera module 11 slowly and gradually decreases to an initial value, instead of directly decreasing to the initial value. In a slowly changing process of the magnetic force, the camera module slowly displaces and rotates correspondingly, so that image stabilization is realized in an entire image shooting process. In addition, after the magnetic force finally disappears, the camera module 11 returns to an original relative spatial position, and keeps in a magnetic levitation state. It should be noted that, in FIG. 5*a* and FIG. 5*b*, 11 denotes the camera module, 12 denotes the cavity, and 123 denotes a lens. FIG. 5*a* and FIG. 5*b* only illustrate a changing status of a spatial position of the camera module 11 in the cavity 12. In practical application, the camera module 11 is blocked by the lens 123 and located in the cavity 12.

According to a magnetic levitation technology, when the foregoing electronic device provided in this embodiment is used in mobile image shooting, an absolute spatial position of the camera module 11 remains unchanged, that is, an image shooting direction of the camera apparatus 10 remains unchanged, so that instantaneous image stabilization of the electronic device in three-dimensional space is realized.

In addition, the electronic device provided in this embodiment has a lighter and thinner structure and a smaller size. This is conducive to implementing a lighting and thinning design of an entire device. Moreover, an image stabilization angle is large; and an application scope is wide.

FIG. 6 is a schematic flowchart of a control method 600 according to an example embodiment of this application. The method is applied to the electronic device described in the foregoing embodiments, and may be specifically executed by hardware and/or software mounted in the electronic device 1010. The method includes the following steps.

S610: In a case that an image shooting function of a camera apparatus is enabled, control a detector to detect shake information of the electronic device, where the shake information includes at least one of longitudinal/latitudinal displacement information, altitude information, and a rotation angle.

S620: Obtain target control information based on the shake information, where the target control information includes a size and/or a direction of an electrical signal.

It may be understood that the controller may analyze the shake information to obtain the target control information. This is not limited in this embodiment.

S630: Supply, by using a power manager, a coil with a target electrical signal corresponding to the target control information, to adjust a magnetic field status of a second magnetic field generated by the coil, thereby making a camera module perform predetermined movement under the action of a first magnetic field and the second magnetic field, where the predetermined movement includes displacement and/or angular deflection, and the first magnetic field is generated by a permanent magnet in the camera apparatus.

For specific implementation processes of S610 to S630, refer to foregoing detailed descriptions of the electronic device. Details are not described herein in this embodiment again.

In this embodiment of this application, a detector detects shake information of the electronic device during a mobile image shooting process, then target control information is obtained based on the shake information, and finally a power manager supplies a coil with a target electrical signal corresponding to the target control information, to adjust a magnetic field status of a second magnetic field generated by the coil, thereby making a camera module perform predetermined movement under the action of a first magnetic field generated by a permanent magnet and the second magnetic field, where the predetermined movement includes displacement and/or angular deflection. Therefore, when the electronic device is used for mobile image shooting, an image shooting direction of the camera apparatus remains unchanged, thereby realizing instantaneous image stabilization of the camera apparatus in three-dimensional space.

It should be noted that the control method provided in the foregoing embodiments of this application may be performed by a control apparatus or a control module that is in the control apparatus and that is configured to perform the control method. In the following part, the control apparatus provided in embodiments of this application is described in this embodiment of this application by using an example in which the control apparatus performs the control method.

An example embodiment of this application further provides a control apparatus. The apparatus may be applied to the electronic device provided in the foregoing embodiment. The apparatus includes: a detection module, configured to: in a case that an image shooting function of a camera apparatus is enabled, control a detector to detect shake information of the electronic device; an analysis module, configured to obtain target control information based on the shake information, where the target control information includes a size and/or a direction of an electrical signal; and an adjustment module, configured to supply, by using a power manager, a coil with a target electrical signal corresponding to the target control information, to adjust a magnetic field status of a second magnetic field generated by the coil, thereby making a camera module perform predetermined movement under the action of a first magnetic field and the second magnetic field, where the predetermined movement includes displacement and/or angular deflection, and the first magnetic field is generated by a permanent magnet in the camera apparatus.

For the control apparatus in this embodiment, specific implementations of operations performed by the modules have been described in detail in embodiments of the method. Details are not described herein again.

In this embodiment, a detector detects shake information of the electronic device during a mobile image shooting process, then the shake information is analyzed to obtain target control information, and finally a power manager supplies a coil with a target electrical signal corresponding to the target control information, to adjust a magnetic field status of a second magnetic field generated by the coil, thereby making a camera module perform predetermined movement under the action of a first magnetic field generated by a permanent magnet and the second magnetic field, where the predetermined movement includes displacement and/or angular deflection. Therefore, when the electronic device is used for mobile image shooting, an image shooting direction of the camera apparatus remains unchanged, thereby realizing instantaneous image stabilization of the camera apparatus in three-dimensional space.

It should be noted that, in this application, the terms "include", "comprise", or any of their variants are intended to cover a non-exclusive inclusion, so that a process, an article, or an apparatus that includes a list of elements not only includes those elements but also includes other elements which are not expressly listed. In the absence of more restrictions, an element defined by "including a . . . " does not exclude another same element in a process, an article, or an apparatus that includes the element.

The embodiments of this application are described above with reference to the accompanying drawings. However, this application is not limited to the foregoing specific implementations. The foregoing specific implementations are merely illustrative instead of restrictive. Under the enlightenment of this application, a person of ordinary skill in the art may make many forms without departing from the essence of this application and the protection scope of claims, all of which fall within the protection of this application.

What is claimed is:

1. An electronic device, comprising a controller, a power manager, a detector, and a camera apparatus, wherein the camera apparatus comprises a camera module and a cavity, wherein a permanent magnet is disposed on the camera module, a coil is disposed on an inner wall of the cavity, and the camera module is disposed in the cavity; and the controller is separately connected to the detector, the power manager, and the camera apparatus, and the power manager is connected to the camera apparatus;

the cavity comprises a first side wall and a second side wall that are opposite to each other, the first side wall is provided with a first camera lens hole, and the second side wall is provided with a second camera lens hole corresponding to the first camera lens hole; and lenses are respectively mounted in the first camera lens hole and the second camera lens hole, and a camera lens of the camera module faces the first camera lens hole.

2. The electronic device according to claim 1, wherein there are a plurality of permanent magnets, the camera module comprises at least two surfaces, and the permanent magnets are respectively disposed on at least two of the surfaces.

3. The electronic device according to claim 2, wherein a direction of a first magnetic field generated by the permanent magnet on a first surface is opposite to that of a first magnetic field generated by the permanent magnet on a second surface, and the first surface and the second surface are disposed back to back.

4. The electronic device according to claim 2, wherein there are a plurality of coils, the cavity comprises at least two inner walls that are in a one-to-one correspondence with the coils, and each of the coils is disposed in one of the at least two inner walls; and in a case that the coils are electrified, the camera module can be suspended in the cavity under the joint action of the first magnetic fields generated by the plurality of permanent magnets and second magnetic fields generated by the plurality of coils.

5. The electronic device according to claim 4, wherein each of the coils comprises at least two sub-coils, the at least two sub-coils are separately connected to the power manager, and the power manager is configured to separately control magnetic forces generated by the at least two sub-coils.

6. The electronic device according to claim 1, wherein the cavity is one of a cubic cavity, a cuboid-shaped cavity, and a spherical cavity.

7. The electronic device according to claim 1, wherein the detector comprises a gyroscope.

8. A control method, applied to the electronic device according to claim 1, wherein the method comprises:

in a case that an image shooting function of the camera apparatus is enabled, controlling the detector to detect shake information of the electronic device;

obtaining target control information based on the shake information, wherein the target control information comprises a size and/or a direction of an electrical signal; and supplying, by using the power manager, the coil with a target electrical signal corresponding to the target control information, to adjust a magnetic field status of a second magnetic field generated by the coil, thereby making the camera module perform predetermined movement under the action of a first magnetic field and the second magnetic field, wherein the predetermined movement comprises displacement and/or angular deflection, and the first magnetic field is generated by the permanent magnet in the camera apparatus.

9. The method according to claim 8, wherein the shake information comprises at least one of longitudinal/latitudinal displacement information, altitude information, and a rotation angle.

10. The method according to claim 8, wherein there are a plurality of permanent magnets, the camera module comprises at least two surfaces, and the permanent magnets are respectively disposed on at least two of the surfaces.

11. The method according to claim 10, wherein a direction of a first magnetic field generated by the permanent magnet on a first surface is opposite to that of a first magnetic field generated by the permanent magnet on a second surface, and the first surface and the second surface are disposed back to back.

12. The method according to claim 10, wherein there are a plurality of coils, the cavity comprises at least two inner walls that are in a one-to-one correspondence with the coils, and each of the coils is disposed in one of the at least two inner walls; and in a case that the coils are electrified, the camera module can be suspended in the cavity under the joint action of the first magnetic fields generated by the plurality of permanent magnets and second magnetic fields generated by the plurality of coils.

13. The method according to claim 12, wherein each of the coils comprises at least two sub-coils, the at least two sub-coils are separately connected to the power manager, and the power manager is configured to separately control magnetic forces generated by the at least two sub-coils.

14. The method according to claim 8, wherein the cavity is one of a cubic cavity, a cuboid-shaped cavity, and a spherical cavity.

15. The method according to claim 8, wherein the detector comprises a gyroscope.

* * * * *